(12) United States Patent
Kanukotla et al.

(10) Patent No.: US 12,548,491 B2
(45) Date of Patent: Feb. 10, 2026

(54) DEVICE AND METHODS FOR MANAGING FRAME DROPS FOR ENHANCED USER DEVICE EXPERIENCE

(71) Applicant: Samsung Electronics Co., Ltd., Suwon-si (KR)

(72) Inventors: Anuradha Kanukotla, Bengaluru (IN); Manith Shetty, Bengaluru (IN); Narendra Mutyala, Bengaluru (IN); Sethu Mathavan B, Bengaluru (IN); Vineeth Sai Kareti, Bengaluru (IN); Praan Garg, Bengaluru (IN); Sripurna Mutalik, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/777,034

(22) Filed: Jul. 18, 2024

(65) Prior Publication Data

US 2025/0118241 A1    Apr. 10, 2025

Related U.S. Application Data

(63) Continuation of application No. PCT/KR2024/009060, filed on Jun. 28, 2024.

(30) Foreign Application Priority Data

Oct. 4, 2023   (IN) .............................. 202341066632

(51) Int. Cl.
  *G09G 3/20*   (2006.01)
(52) U.S. Cl.
  CPC ... *G09G 3/2092* (2013.01); *G09G 2340/0435* (2013.01); *G09G 2354/00* (2013.01)

(58) Field of Classification Search
  CPC .................................................... G09G 3/2092
  See application file for complete search history.

(56) References Cited

U.S. PATENT DOCUMENTS 9,728,166 B2    8/2017  Law et al.
10,475,405 B2   11/2019 Choudha et al.
(Continued)

FOREIGN PATENT DOCUMENTS

CN         114911616 A   8/2022
KR    10-2021-0092571 A   7/2021
(Continued)

OTHER PUBLICATIONS

International Search Report and written opinion dated Oct. 16, 2024, issued in International Application No. PCT/KR2024/009060.

*Primary Examiner* — Gustavo Polo
(74) *Attorney, Agent, or Firm* — Jefferson IP Law, LLP

(57) ABSTRACT

A device and methods for predicting and preventing frame drops to achieve a smooth User Interface (UI) experience on an electronic device are provided. The method includes determining, by the electronic device, one or more display frame parameters for displaying each frame, determining, by the electronic device, one or more device operating parameters indicative of a system state of one or more resources in the electronic device, estimating, by the electronic device, a preparation time for rendering each frame on the electronic device using the one or more display frame parameters and the one or more device operating parameters, and adjusting, by the electronic device, the one or more resources in the electronic device to reduce the preparation time, in response to the estimated preparation time indicating occurrence of a frame drop.

20 Claims, 16 Drawing Sheets

(56) References Cited

U.S. PATENT DOCUMENTS

| | | | |
|---|---|---|---|
| 11,386,866 B2 | 7/2022 | Sin et al. | |
| 2009/0063699 A1 | 3/2009 | Chapweske et al. | |
| 2011/0129116 A1* | 6/2011 | Thorwirth | G06T 1/0092 |
| | | | 382/100 |
| 2015/0109286 A1 | 4/2015 | Verbeure et al. | |
| 2021/0225320 A1 | 7/2021 | Sin et al. | |
| 2021/0232201 A1 | 7/2021 | Chen et al. | |

FOREIGN PATENT DOCUMENTS

| | | |
|---|---|---|
| KR | 10-2024-0054828 A | 4/2024 |
| WO | 2018/191086 A1 | 10/2018 |
| WO | 2021/196175 A1 | 10/2021 |

* cited by examiner

Frame

Frame Hierarchy

DEVICE AND METHODS FOR MANAGING FRAME DROPS FOR ENHANCED USER DEVICE EXPERIENCE

CROSS-REFERENCE TO RELATED APPLICATION(S)

This application is a continuation application, claiming priority under § 365(c), of an International application No. PCT/KR2024/009060, filed on Jun. 28, 2024, which is based on and claims the benefit of an Indian patent application number 202341066632, filed on Oct. 4, 2023, in the Indian Intellectual Property Office, the disclosure of which is incorporated by reference herein in its entirety.

BACKGROUND

1. Field

The disclosure relates to frame drop management in electronic devices. More particularly, the disclosure relates to predicting and preventing frame drops to achieve a smooth User Interface (UI) experience on an electronic device.

2. Description of Related Art

Electronic devices which support displays with Higher Refresh Rates (HRR) are aggressively expanding, for example from 90 Frames Per Second (FPS) and 120 FPS displays. Due to increase in refresh rate, multiple applications and devices have less time to prepare and render a new frame leading to jankiness or frame drop. For example, most android applications struggle to handle input, animations and render content within a Vertical Sync (Vsync) interval of 8.3 ms for 120 Hz displays. Common approach to frame drop problem is to allocate high performance Central Processing Unit (CPU) core running at maximum level frequency to User Interface (UI) and rendering tasks for all frames. However, this leads to battery drain and rise in device temperatures.

FIG. 1 depicts a frame drop scenario according to the related art.

For example, based on a display refresh rate, a frame has to complete execution with Vsync pulses. For 120 Hz, Vsync pulses duration is 8.33 ms. If frame duration exceeds the Vsync pulses duration (threshold), then it is referred as a frame drop causing jank/stutter. An application frame timeline includes time taken by several modules, such as input handling time, animation, Layout and measure, inflate, draw, Graphics Processing Unit (GPU) completion time, and so on, as depicted in the FIG. 1.

For example, user interaction parameters such as frequency of touch event can make an impact on frame drop. When touch events are regular (such as slow scrolling) and number of touch inputs is in regular pattern, no frame drop can be seen. When number of touch events are irregular and fast scrolling is applied, the frame drop count can be increased.

Existing methods predict video frame delay after the frame execution. Further, Vsync adjustment is implemented according to the video frame rate. However, the existing methods have not been applied for improving the application frame time.

Hence, there is a need in the art for solutions which will overcome the above mentioned drawback(s), among others.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and methods for predicting and preventing one or more frame drops to enhance User Interface (UI) experience on an electronic device.

Another aspect of the disclosure is to provide a device and methods for predicting the duration of one or more frames to determine consecutive frame drops and implement proactive decisions such as boosting/scheduling in order to reduce frame drops.

Another aspect of the disclosure is to provide a device and methods for determining one or more display frame parameters (such as input handling duration, animation duration, draw duration, and so on) for displaying each frame on the device.

Another aspect of the disclosure is to is to provide a device and methods for determining one or more operating parameters indicative of a state of resources (such as Central Processing Unit (CPU) load, Graphics Processing Unit (GPU) state, available memory, number of running threads on CPU, temperature, and so on) in the device.

Another aspect of the disclosure is to provide a device and methods for estimating a preparation time for rendering each frame on the device using the display frame parameters and the operating parameters, and adjusting the resources in the device to reduce the preparation time if the estimated preparation time indicates occurrence of a frame drop.

Additional aspects will be set forth in part in the description which follows and, in part, will be apparent from the description, or may be learned by practice of the presented embodiments.

In accordance with an aspect of the disclosure, a method for managing frame drops in an electronic device is provided. The method includes determining, by the electronic device, one or more display frame parameters for displaying each frame, determining, by the electronic device, one or more device operating parameters indicative of a system state of one or more resources in the electronic device, estimating, by the electronic device, a preparation time for rendering each frame on the electronic device using the display frame parameters and the device operating parameters, and adjusting, by the electronic device, the resources in the electronic device to reduce the preparation time, in response to the estimated preparation time indicating occurrence of a frame drop.

In accordance with another aspect of the disclosure, an electronic device is provided. The electronic device includes memory storing one or more computer programs, and one or more processors communicatively coupled to the memory wherein the one or more computer programs include computer-executable instructions that, when executed by the one or more processors individually or collectively, cause the electronic device to manage frame drops. The computer-executable instructions further cause the electronic device to determine one or more display frame parameters for displaying each frame, determine one or more device operating parameters indicative of a system state of one or more resources in the electronic device, estimate a preparation time for rendering each frame on the electronic device using the display frame parameters and the device operating parameters, and adjust the resources in the electronic device to reduce the preparation time, in response to the estimated preparation time indicating occurrence of a frame drop.

In accordance with another aspect of the disclosure, one or more non-transitory computer-readable storage media are provided. The one or more non-transitory computer-readable storage media storing one or more computer programs including computer-executable instructions that, when executed by one or more processors of an electronic device individually or collectively, cause the electronic device to perform operations are provided. The operations include determining, by the electronic device, one or more display frame parameters for displaying each frame, determining, by the electronic device, one or more device operating parameters indicative of a system state of one or more resources in the electronic device, estimating, by the electronic device, a preparation time for rendering each frame on the electronic device using the one or more display frame parameters and the one or more device operating parameters, and adjusting, by the electronic device, the one or more resources in the electronic device to reduce the preparation time, in response to the estimated preparation time indicating occurrence of a frame drop.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
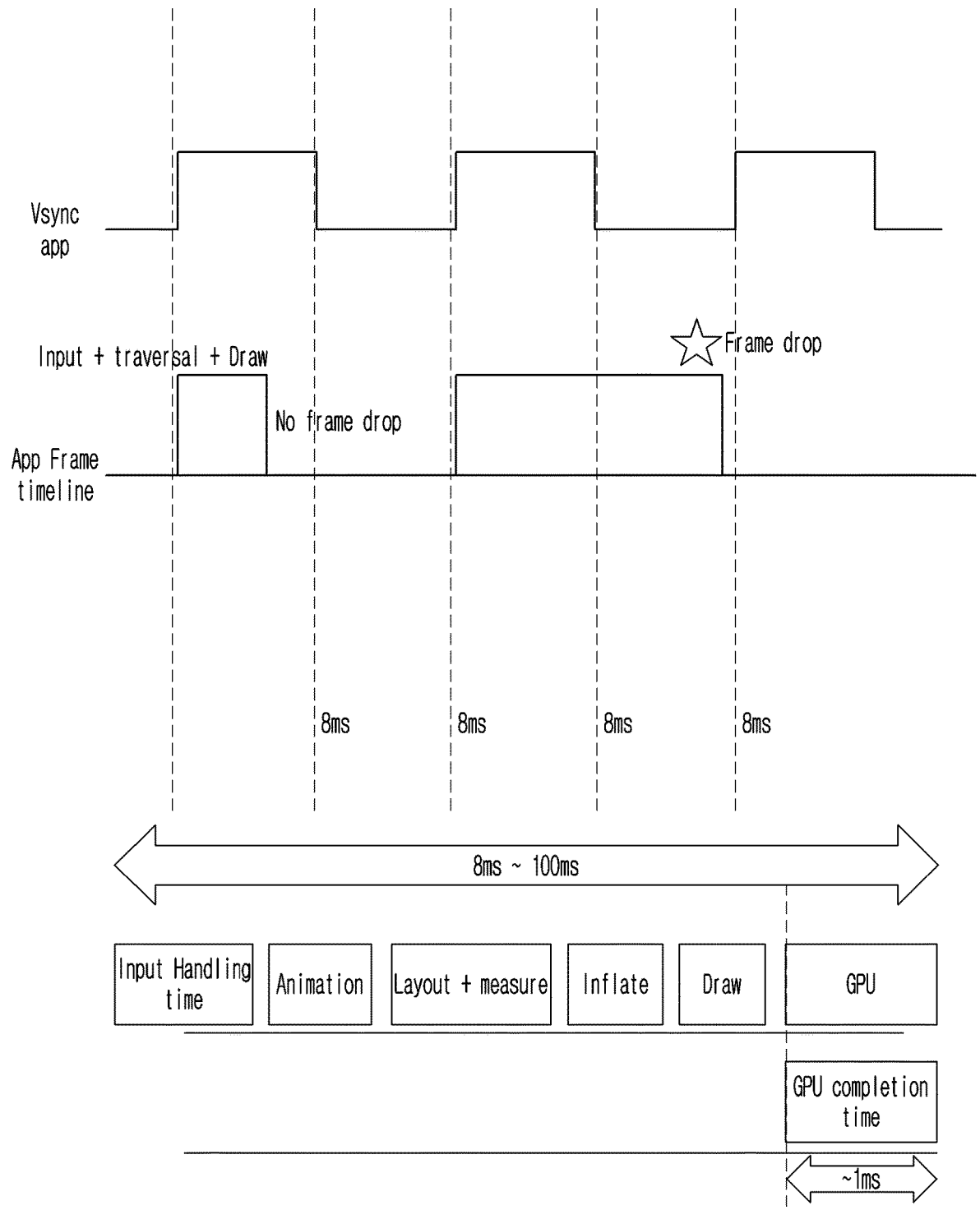
FIG. 1 depicts a frame drop scenario, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein provide a device and methods for predicting and preventing one or more frame drops to enhance User Interface (UI) experience on an electronic device. Referring now to the drawings, and more particularly to FIGS. 2, 3A, 3B, 4 to 8, 9A, 9B, 10, 11A to 11C, and 12, where similar reference characters denote corresponding features consistently throughout the figures, there are shown embodiments.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 2:
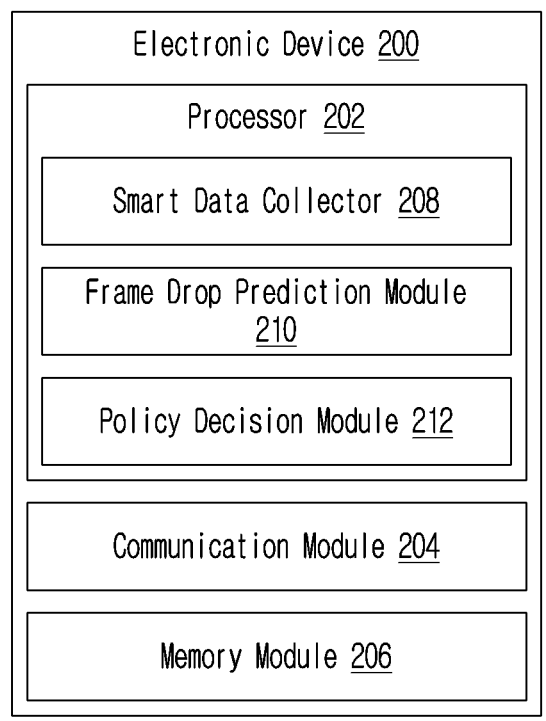
FIG. 2 illustrates a block representation of an electronic device for managing frame drops, according to an embodiment of the disclosure.

FIG. 2 illustrates a block representation of an electronic device 200 for managing frame drops according to an embodiment of the disclosure.

Frame drops occur on the display of the electronic device 200, when one or more applications fail to render a new frame within a Vertical Sync (Vsync) interval of the display due to increased refresh rate.

Figure 3A:
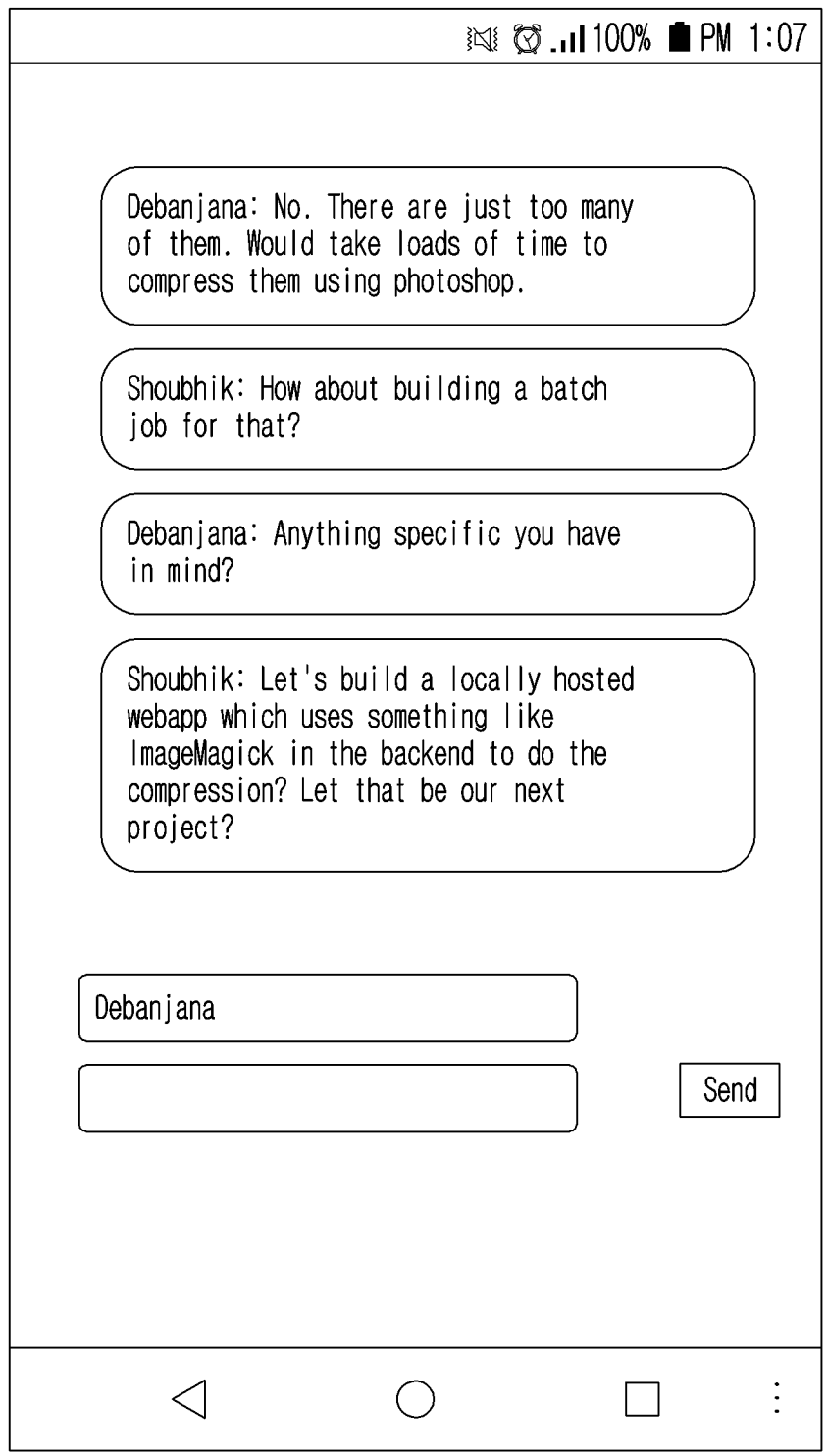
FIG. 3A represents examples of a frame and a frame hierarchy, according to an embodiment of the disclosure.
Figure 3B:
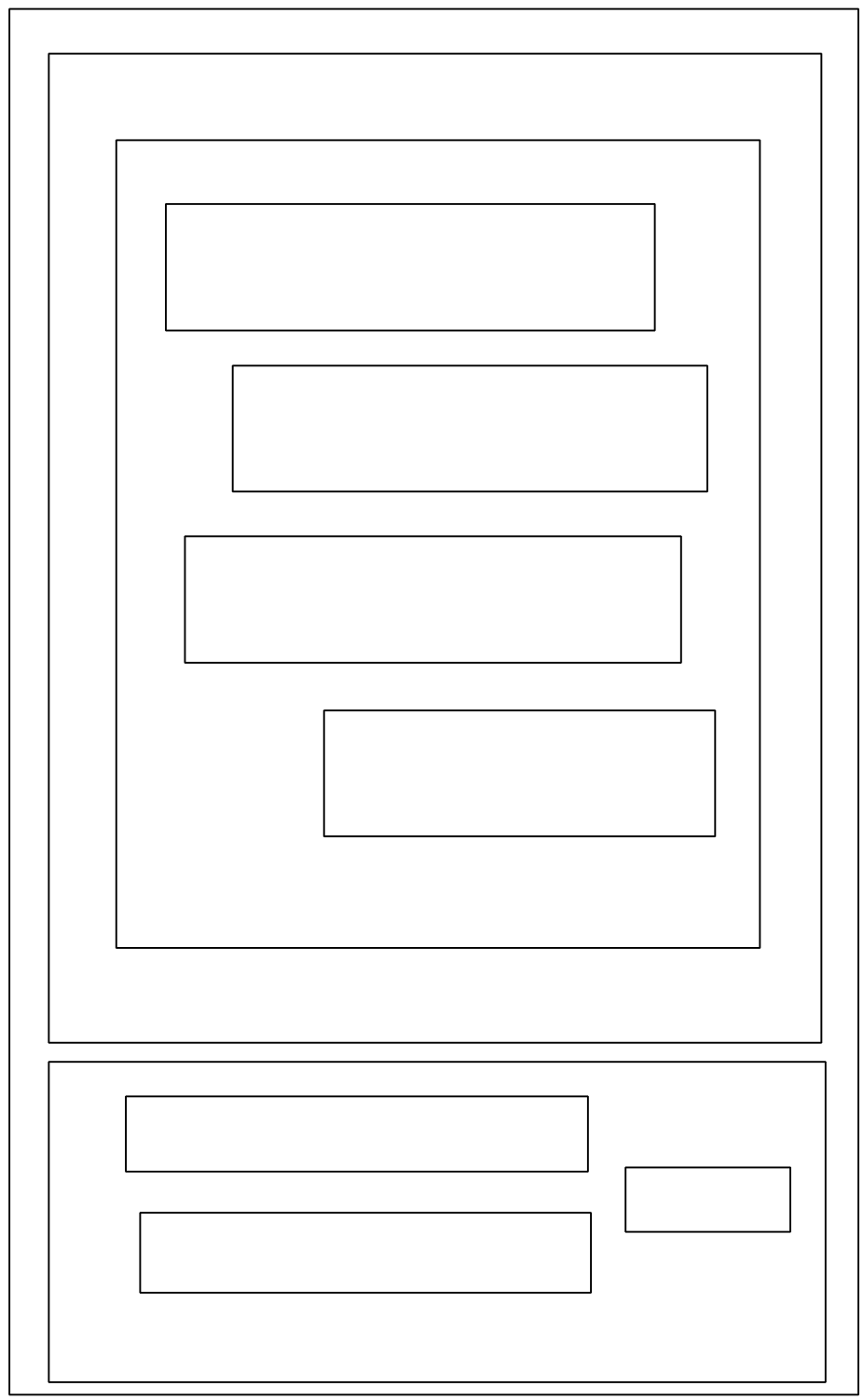
FIG. 3B represents examples of a frame and a frame hierarchy, according to an embodiment of the disclosure.

FIGS. 3A and 3B represent examples of a frame and a frame hierarchy according to various embodiments of the disclosure.

The frame represents a display frame with one or more visual components on a display. For example, a display frame is composition of multiple application view data that comprises of such as layouts, widgets, resources (images, text), and so on, that is rendered onto a physical display. The electronic device 200 comprises a processor 202, a communication module 204, and a memory module 206. The electronic device 200 can be, but not limited to, a smart phone, a smart watch, a tablet, a desktop, a laptop, a personal digital assistant, a wearable device, and so on.

In an embodiment herein, the processor 202 can evaluate past frame data in multiple scenarios and predict the duration of next frame or consecutive frames. The processor 202 can determine the occurrence of a frame drop by predicting frame duration. Further, the processor 202 can implement proactive decisions like boosting/scheduling for reducing the frame drops, if the frame drop is determined.

The processor 202 further comprises a smart data collector 208, a frame drop prediction module 210, and a policy decision module 212.

In an embodiment herein, the smart data collector 208 can determine one or more display frame parameters for displaying each frame. The display frame parameters can be, but not limited to, input handling duration, animation duration, draw duration, tree structure, buffer swap, enqueue and dequeue durations, layout measure duration, sync duration, swap buffers duration, Graphics Processing Unit (GPU) execution time and any other frame delay related parameter. The smart data collector 208 can determine one or more device operating parameters indicative of a system state of one or more resources in the electronic device 200. The resources can be, but not limited to, Central Processing Unit (CPU), scheduler, governor, and so on. The device operating parameters can be, but not limited to, load of a CPU, state of a GPU, available memory, number of running threads on the CPU, temperature during current frame rendering, and so on. The smart data collector 208 can aggregate the determined display frame parameters and the device operating parameters. The smart data collector 208 further comprises a scenario detector 402 and a data aggregator 404, as depicted in FIG. 4.

Figure 4:
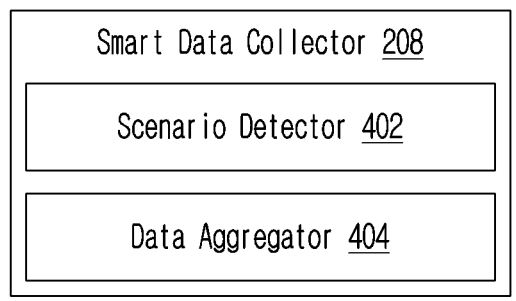
FIG. 4 illustrates modules of a smart data collector, according to an embodiment of the disclosure.

FIG. 4 illustrates modules of a smart data collector, according to an embodiment of the disclosure.

In an embodiment herein, the scenario detector 402 can detect a scenario of having a possibility of the frame drop based on one or more parameters from at least one touch input received from a user. The parameters from the touch input can be, but not limited to, frequency, velocity, input pressure level, at least one multi-hand gesture, and so on. For example, the frequency of the touch input can be number of input events in time (such as, aggressive scroll, aggressive user interaction, and so on). For example, the velocity of the touch input can be delta of x, y co-ordinates of user input. The detected scenario can be, but not limited to, aggressive scrolling, gaming, playing high resolution content, and so on. The scenario detector 402 can trigger the frame drop management based on the detected scenario.

In an embodiment herein, the data aggregator 404 can collect information related to the detected scenario from the scenario detector 402. The data aggregator 404 can aggregate the display frame parameters, the device operating parameters, and window composer parameters. For example, the window composer parameters can be, but not limited to blur, number of layers, and so on.

In an embodiment herein, the scenario detector 402 responsibility is to execute the data aggregator 404 during high frame drop scenarios such as scrolling, application usage, and so on.

In an embodiment herein, the frame drop prediction module 210 receives the information related to the detected scenario and the aggregated data from the data aggregator 404. The frame drop prediction module 210 can estimate a preparation time for rendering each frame on the electronic device 200 using the aggregated data of the display frame parameters, the device operating parameters, and window composer parameters, and information related to the detected scenario. The preparation time for rendering each frame is estimated using a frame duration prediction (FDP) method. The FDP method is a Machine Learning (ML) method. The FDP method is trained to learn a correlation between the display frame parameters, the device operating parameters and the preparation time for rendering each frame. The trained FDP method is configured to predict a consecutive frame duration based on a current frame duration. The trained FDP method is further configured to determine the frame drop, if the predicted consecutive frame duration exceeds a predetermined threshold.

In an embodiment herein, the policy decision module 212 can adjust the resources in the electronic device 200 to reduce the preparation time, if the estimated preparation time indicates occurrence of a frame drop. The resources can include, but not limited to, CPU, scheduler, governor, and so on. The resources can be adjusted for a pre-determined duration. The resources can be adjusted by determining a window duration based on a frame count. The method of adjusting the resources can include, but not limited to, CPU boosting, scheduling and governing tasks, and so on.

In an embodiment herein, the processor 202 can process and execute data of a plurality of modules of the electronic device 200 respectively. The processor 202 can be configured to execute instructions stored in the memory module 206. The processor 202 may comprise one or more of microprocessors, circuits, and other hardware configured for processing. The processor 202 can be at least one of a single processer, a plurality of processors, multiple homogeneous or heterogeneous cores, multiple Central Processing Units (CPUs) of different kinds, microcontrollers, special media, and other accelerators. The processor 202 may be an application processor (AP), a graphics-only processing unit (such as a graphics processing unit (GPU), a visual processing unit (VPU)), and/or an Artificial Intelligence (AI)-dedicated processor (such as a neural processing unit (NPU)).

In an embodiment herein, the plurality of modules of the processor 202 of the electronic device 200 can communicate via the communication module 204. The communication module 204 may be in the form of either a wired network or a wireless communication network module. The wireless communication network may comprise, but not limited to, Global Positioning System (GPS), Global System for Mobile Communications (GSM), Wi-Fi, Bluetooth low energy, Near-field communication (NFC), and so on. The wireless communication may further comprise one or more of Bluetooth, ZigBee, a short-range wireless communication (such as Ultra-Wideband (UWB)), and a medium-range wireless communication (such as Wi-Fi) or a long-range wireless communication (such as third generation (3G)/fourth generation (4G)/fifth generation (5G)/sixth generation (6G) and non-third generation partnership project (3GPP) technologies or worldwide interoperability for microwave access (WiMAX)), according to the usage environment.

In an embodiment herein, the memory module 206 may comprise one or more volatile and non-volatile memory components which are capable of storing data and instructions of the modules of the electronic device 200 to be executed. Examples of the memory module 206 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory module 206 may also include one or more computer-readable storage media. Examples of non-volatile storage elements may include magnetic hard discs, optical discs, floppy discs, flash memories, or forms of electrically programmable memories (EPROM) or electrically erasable and programmable (EEPROM) memories. In addition, the memory module 206 may, in some examples, be considered a non-transitory storage medium. The term "non-transitory" may indicate that the storage medium is not embodied in a carrier wave or a propagated signal. However, the term "non-transitory" should not be interpreted to mean that the memory module 206 is non-movable. In certain examples, a non-transitory storage medium may store data that can, over time, change (for example, in Random Access Memory (RAM) or cache).

FIG. 2 shows example modules of the electronic device 200 respectively, but it is to be understood that other embodiments are not limited thereon. In other embodiments, the electronic device 200 may include less or more number of modules. Further, the labels or names of the modules are used only for illustrative purpose and does not limit the scope of the disclosure. One or more modules can be combined together to perform same or substantially similar function in the electronic device 200.

Figure 5:
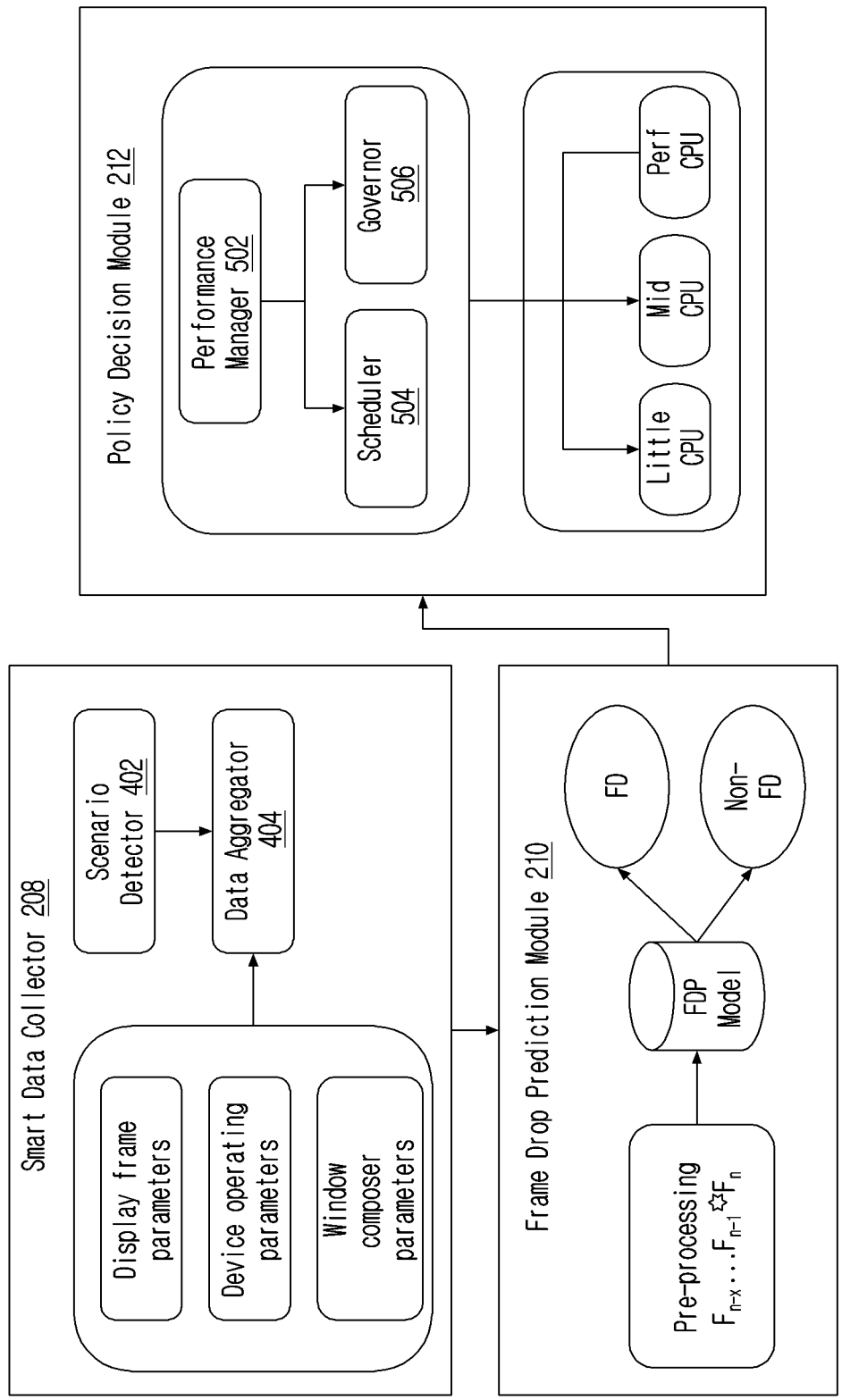
FIG. 5 illustrates a refresh rate reinforcing architecture for managing frame drops, according to an embodiment of the disclosure.

FIG. 5 illustrates a refresh rate reinforcing architecture for managing frame drops according to an embodiment of the disclosure.

Referring to FIG. 5, the smart data collector 208 is responsible for data aggregation. The data aggregator 404 collects information related to a user interaction scenario from the scenario detector 402 and aggregates the display frame parameters, the device operating parameters, and the window composer parameters. The frame drop prediction module 210 retrieves data from the smart data collector 208, pre-processes the data, and transmits the processed data to the FDP model. The FDP model predicts whether the next frame will be dropped such as Frame Drop (FD) or non-FD, and sends the FD events to the policy decision module 212.

The policy decision module 212 is responsible for scheduling and allocation of application threads to CPU cores, and governing CPU frequencies to render next frame within the Vsync interval. The policy decision module 212 comprises a performance manager 502, a scheduler 504, and a governor 506. The performance manager 502 operates the scheduler 504, and the governor 506 based on the FD events for adjusting the little CPU, mid CPU, and perf CPU.

Figure 6:
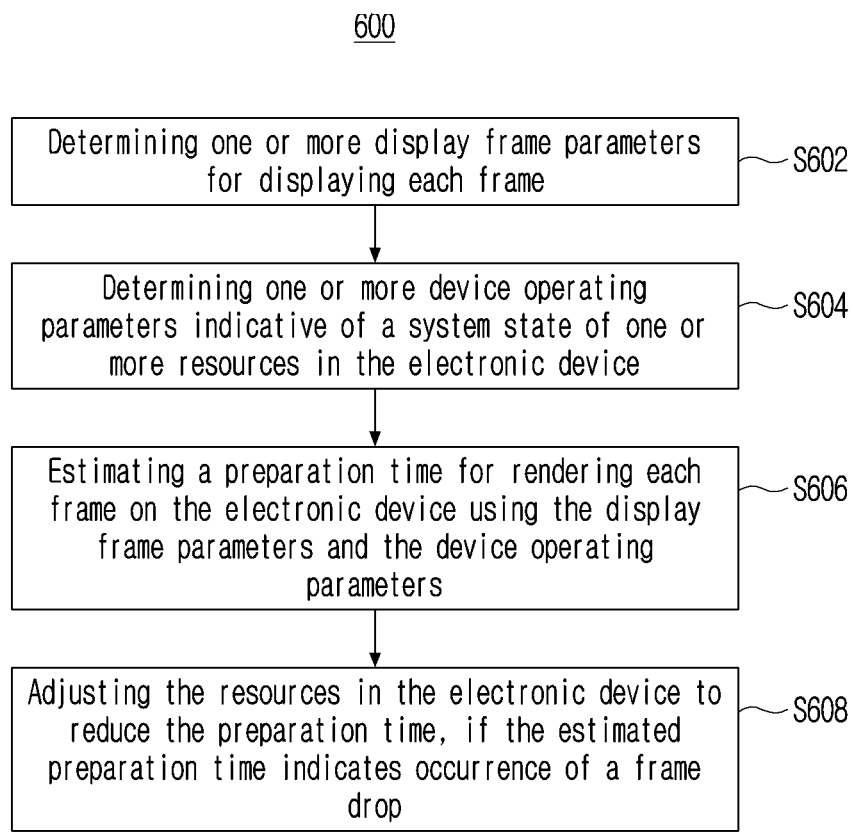
FIG. 6 illustrates a method for managing frame drops in an electronic device, according to an embodiment of the disclosure.

FIG. 6 illustrates a method 600 for managing frame drops in an electronic device 200 according to an embodiment of the disclosure.

The method 600 includes determining, by the electronic device 200, one or more display frame parameters for displaying each frame, as depicted in operation 8602. The method 600 includes determining, by the electronic device 200, one or more device operating parameters indicative of a system state of one or more resources in the electronic device 200, as depicted in operation 8604. The method 600 includes estimating, by the electronic device 200, a preparation time for rendering each frame on the electronic device 200 using the display frame parameters and the device operating parameters, as depicted in operation 8606. The method 600 includes adjusting, by the electronic device 200, the resources in the electronic device 200 to reduce the preparation time, if the estimated preparation time indicates occurrence of a frame drop, as depicted in operation 8608.

The various actions in method 600 may be performed in the order presented, in a different order or simultaneously. Further, in some embodiments, some actions listed in FIG. 6 may be omitted.

Figure 7:
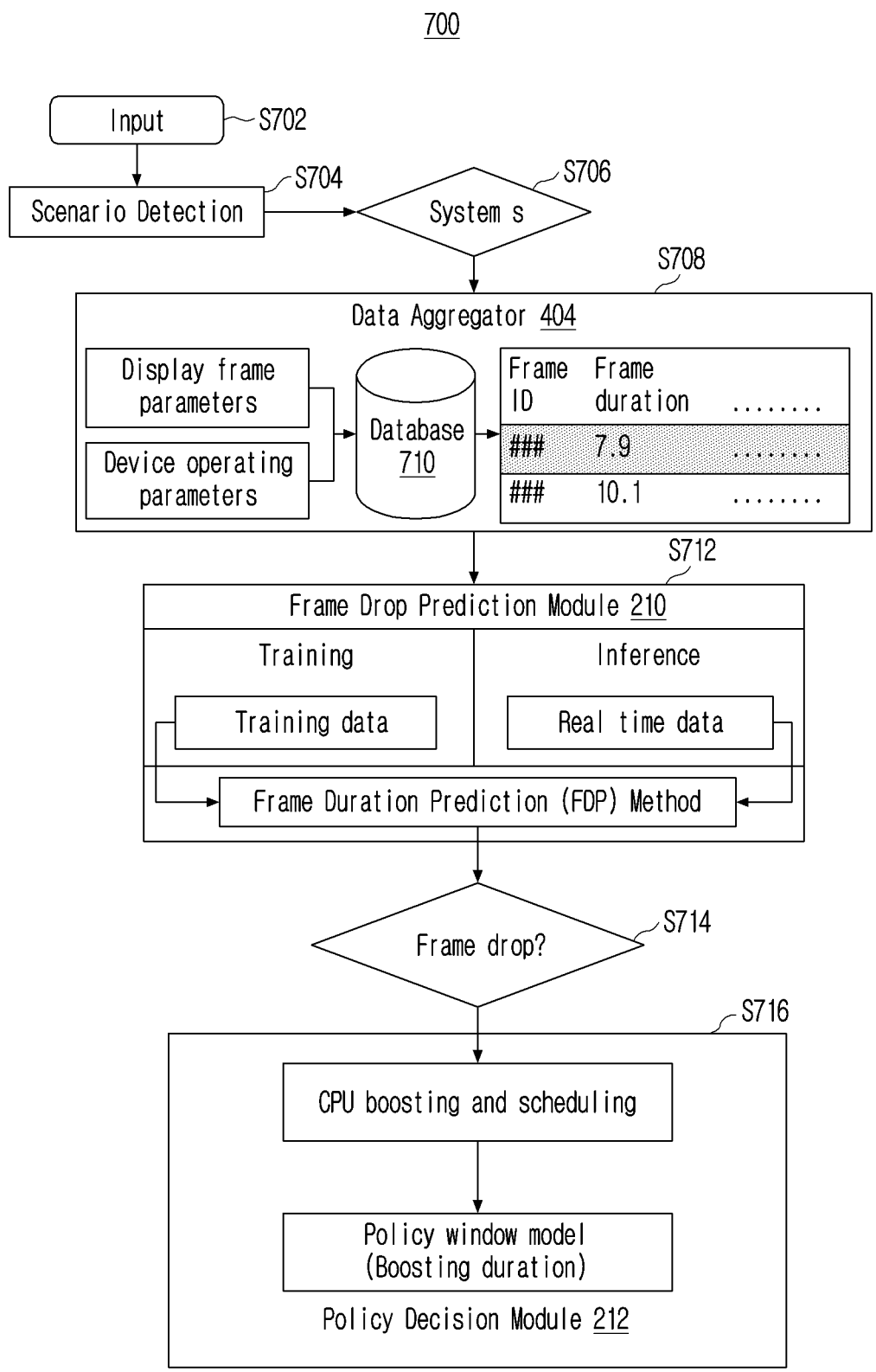
FIG. 7 illustrates a flow process for managing frame drops in the electronic device, according to an embodiment of the disclosure.

FIG. 7 illustrates a flow process 700 for managing frame drops in the electronic device 200 according to an embodiment of the disclosure.

As depicted in operation 8702, an input relevant to one or more touch events is received from a user, for scenario detection. At least one scenario of having a possibility of the frame drop is detected, as depicted in operation 8704, based on one or more parameters from at least one touch input received from the user. The scenario is detected by determining a device context based on frequency of the touch input. Later, a system state of one or more resources is verified from the device context, as depicted in operation 8706. The system state indicates a scenario of having a possibility of a frame drop. The electronic device 200 initiates management of the frame drops, based on the system state. For example, if there is a possibility of the frame drop, the electronic device 200 initiates the frame drop management.

Thereafter, one or more display frame parameters and one or more device operating parameters are aggregated, as depicted in operation 8708, by the data aggregator 404. The display frame parameters and the device operating parameters are determined and compiled into a pre-processed data format for recording into a database 710. The display frame parameters such as frame ID, frame duration, and so on, can be stored in the database 710. The frame drop prediction module 210 is configured with a frame duration prediction (FDP) method. The FDP method is trained with a training data such as data recorded in the database 710 to determine one or more frame durations based on the frequency of the touch input. Later, the trained FDP method predicts a consecutive frame duration based on current frame duration, using real-time inference data, as depicted in operation 8712. The frame drop prediction module 210 estimates the preparation time for rendering each frame using the FDP method.

Thereafter, a frame drop is determined, if the predicted consecutive frame duration exceeds a predetermined threshold. The frame drop condition is verified, as depicted in operation 8714. Later, the policy decision module 212 is invoked to adjust the resources in the electronic device 200 to reduce a preparation time for rendering each frame on the electronic device 200 to avoid an upcoming frame drop, as depicted in operation 8716. For example, CPU boosting and scheduling are performed to reduce the preparation time, by determining a window duration or boosting duration based on a frame count. The policy decision module 212 utilizes a policy window model for determining the window duration or the boosting duration.

The various actions in method 700 may be performed in the order presented, in a different order or simultaneously. Further, in some embodiments, some actions listed in FIG. 7 may be omitted.

Figure 8:
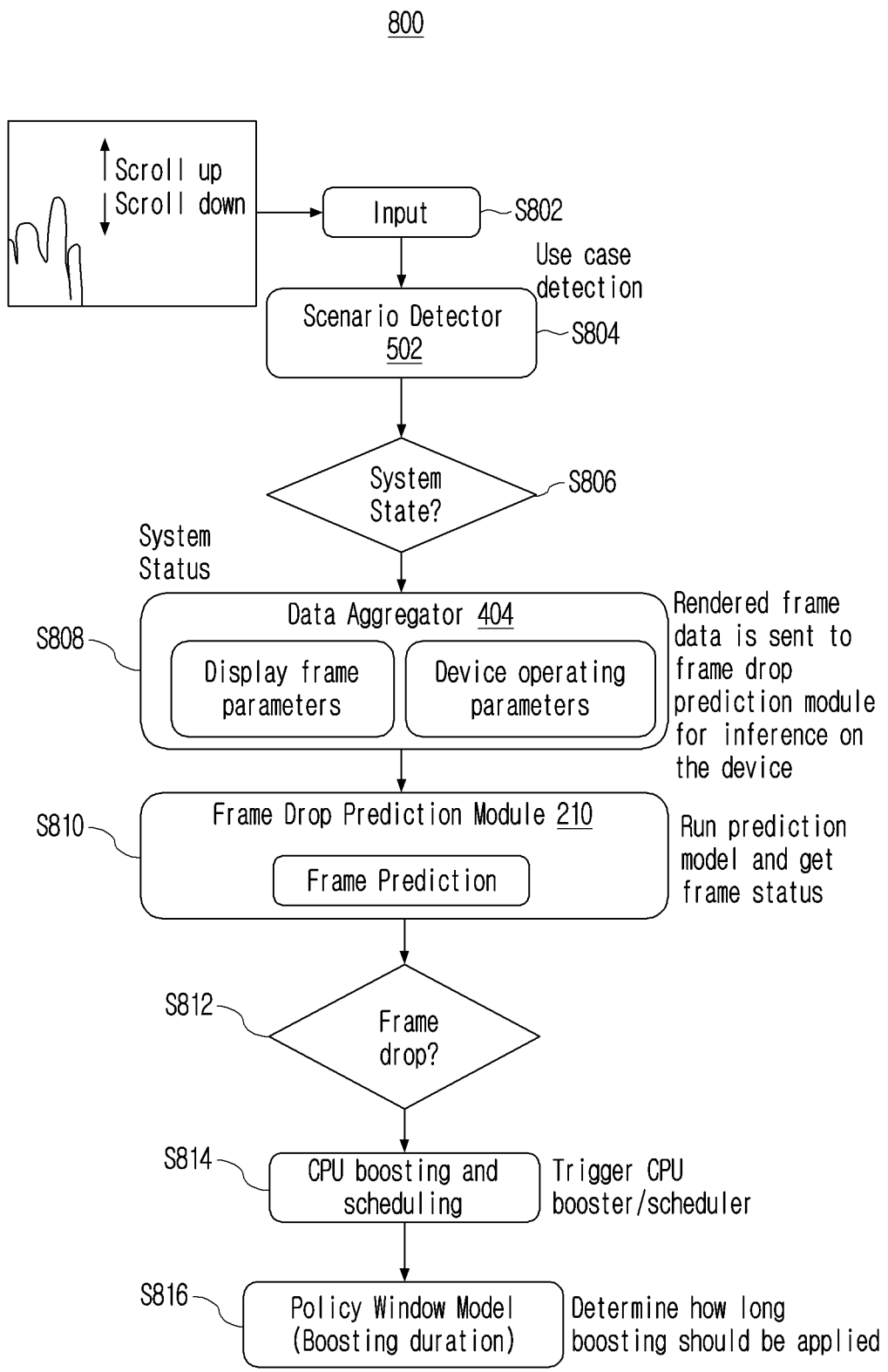
FIG. 8 illustrates a flow process for managing frame drops in the electronic device during scrolling scenario, according to an embodiment of the disclosure.

FIG. 8 illustrates a flow process 800 for managing frame drops in the electronic device 200 during scrolling scenario according to an embodiment of the disclosure.

As depicted in operation 8802, an input relevant to scrolling (such as scrolling up or scrolling down) is received from a user, for scenario detection. The use case of scrolling having a possibility of the frame drop is detected, as depicted in operation 8804, using the scenario detector 402 based on one or more parameters of scrolling received from the user. The scenario is detected by determining a device context based on frequency of the scrolling. Later, a system state of one or more resources is verified from the device context, as depicted in operation 8806. The system state indicates whether scrolling has a possibility of a frame drop. If there is a possibility of the frame drop, the electronic device 200 initiates the frame drop management.

Thereafter, one or more display frame parameters and one or more device operating parameters are aggregated, as depicted in operation 8808, by the data aggregator 404. Rendered display frame parameters and device operating parameters are sent to frame drop prediction module 210 for inference on the device. Later, the trained FDP method of the frame drop prediction module 210 predicts consecutive frame duration based on current frame duration, using real-time inference data, as depicted in operation 8810. The frame drop prediction module 210 estimates the preparation time for rendering each frame using the FDP method.

A frame drop is determined, if the predicted consecutive frame duration exceeds a predetermined threshold. The frame drop condition is verified, as depicted in operation 8812. Later, CPU boosting and scheduling are performed, as depicted in operation 8814, to reduce the preparation time rendered for each frame on the electronic device 200 to avoid an upcoming frame drop. For example, the policy decision module 212 can comprise a CPU booster and/or scheduler 504 that perform boosting and scheduling when triggered. The policy decision module 212 utilizes a policy window model for determining window duration or boosting duration based on a frame count, for determining how long boosting should be applied, as depicted in operation 8816.

The various actions in method 800 may be performed in the order presented, in a different order or simultaneously. Further, in some embodiments, some actions listed in FIG. 8 may be omitted.

Figure 9A:
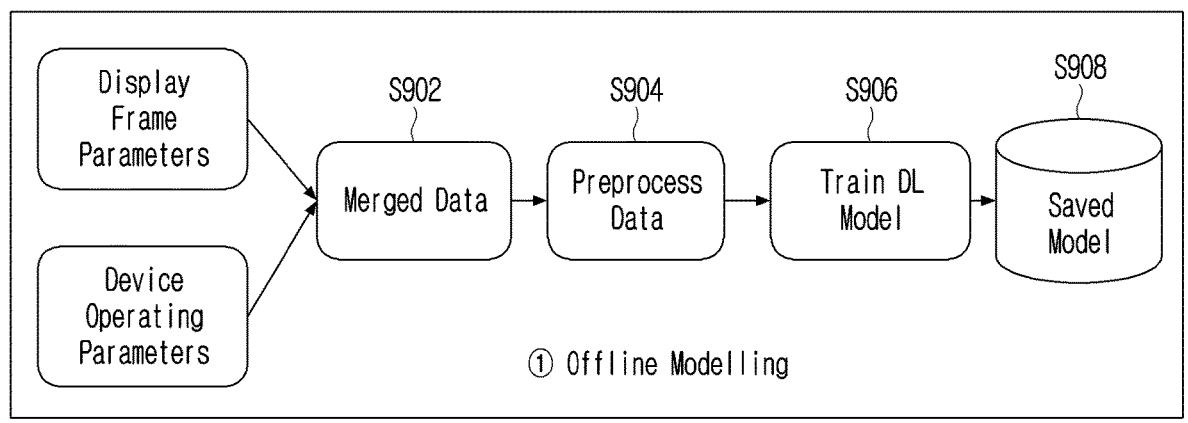
FIG. 9A illustrates an offline modelling of Deep Learning (DL) model using one or more display frame parameters and one or more device operating parameters, according to an embodiment of the disclosure.

FIG. 9A illustrates an offline modelling of Deep Learning (DL) model using one or more display frame parameters and one or more device operating parameters according to an embodiment of the disclosure.

Referring to FIG. 9A, the display frame parameters and the device operating parameters are merged in 8902, and the merged data is sent for preprocessing, as depicted in 8904. The preprocessed data is sent to train the Deep Learning (DL) model, as depicted in 8906. The trained model is saved in the database 710, as depicted in 8908.

Figure 9B:
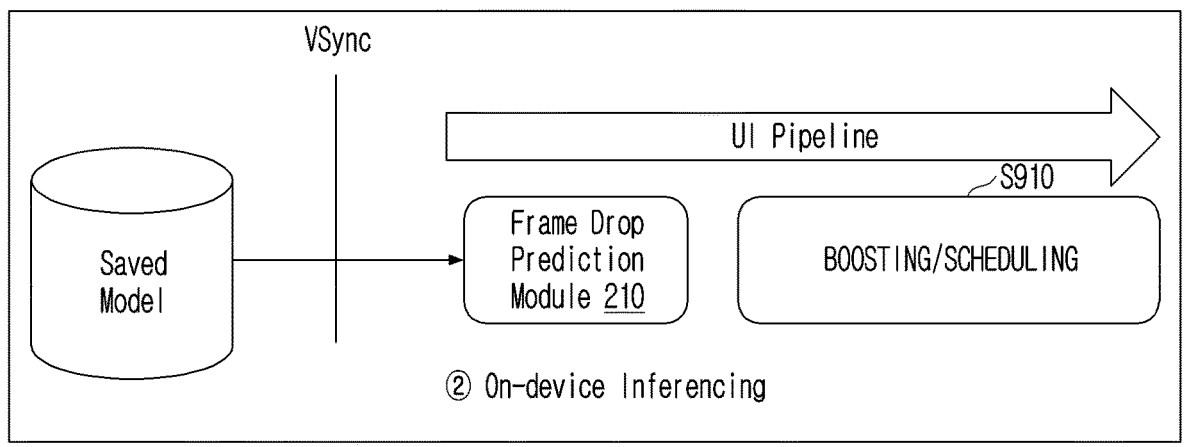
FIG. 9B illustrates an on-device inferencing using the trained DL method for frame drop prediction, according to an embodiment of the disclosure.

FIG. 9B illustrates an on-device inferencing using the trained DL method for frame drop prediction according to an embodiment of the disclosure.

Referring to FIG. 9B, the trained and saved model is applied for the frame drop prediction module 210 within the Vsync interval of the display, for predicting frame drops. Later, boosting and/or scheduling can be implemented by the policy decision module 212, as depicted in 8910, for reducing the frame drops in the user interaction pipeline.

The frame drop prediction module 210 uses pre-trained machine learning model called frame duration prediction (FDP) method to perform on-device inference for early detection of frame drops. The smart data collector 208 invokes the frame drop prediction module 210 by providing input to the FDP method for calculating probability of frame drop.

Figure 10:
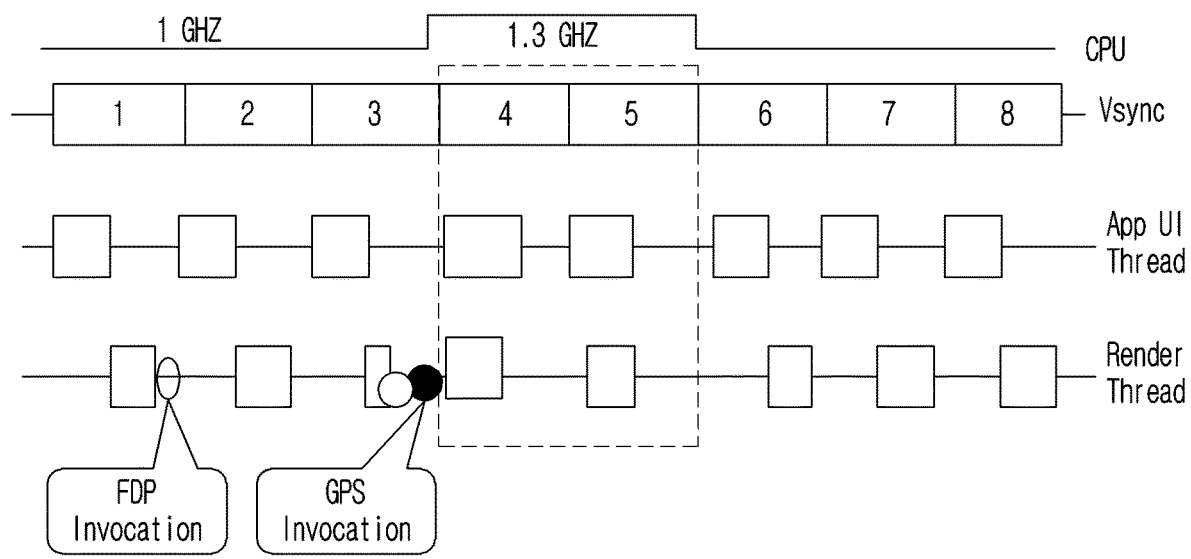
FIG. 10 illustrates triggering of the frame drop prediction module and the policy decision module, according to an embodiment of the disclosure.

FIG. 10 illustrates triggering of the frame drop prediction module 210 and the policy decision module 212 according to an embodiment of the disclosure.

The frame drop prediction module 210 invocation is triggered at the end of every frame. The frame drop prediction module 210 obtains next frame drop probability based on the past history. If probability is greater than a threshold, then the policy decision module 212 is invoked at the start of the frame with expected duration along with Task ID. The policy decision module 212 is responsible to update the CPU load, scheduler 504 and governor parameters of UI task to aid in rendering application UI within the Vsync interval time.

Figure 11A:
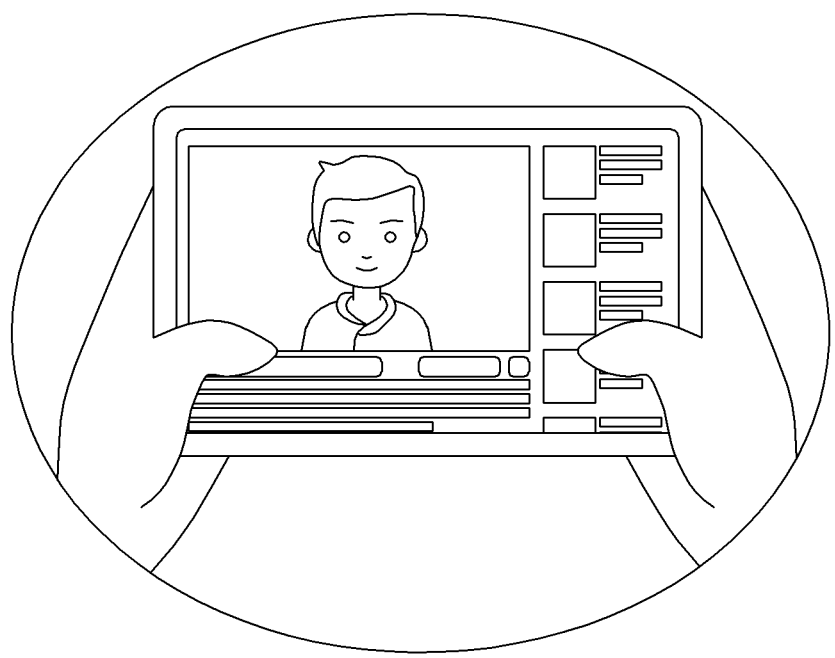
FIG. 11A illustrates different use cases for detecting frame drops in several scenarios and preventing them, according to an embodiment of the disclosure.
Figure 11B:
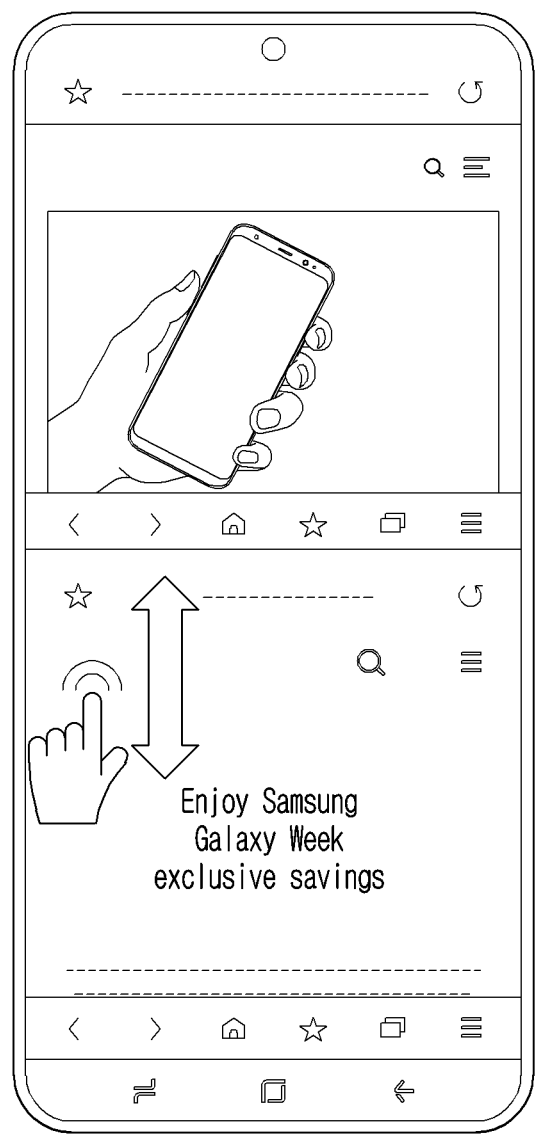
FIG. 11B illustrates different use cases for detecting frame drops in several scenarios and preventing them, according to an embodiment of the disclosure.
Figure 11C:
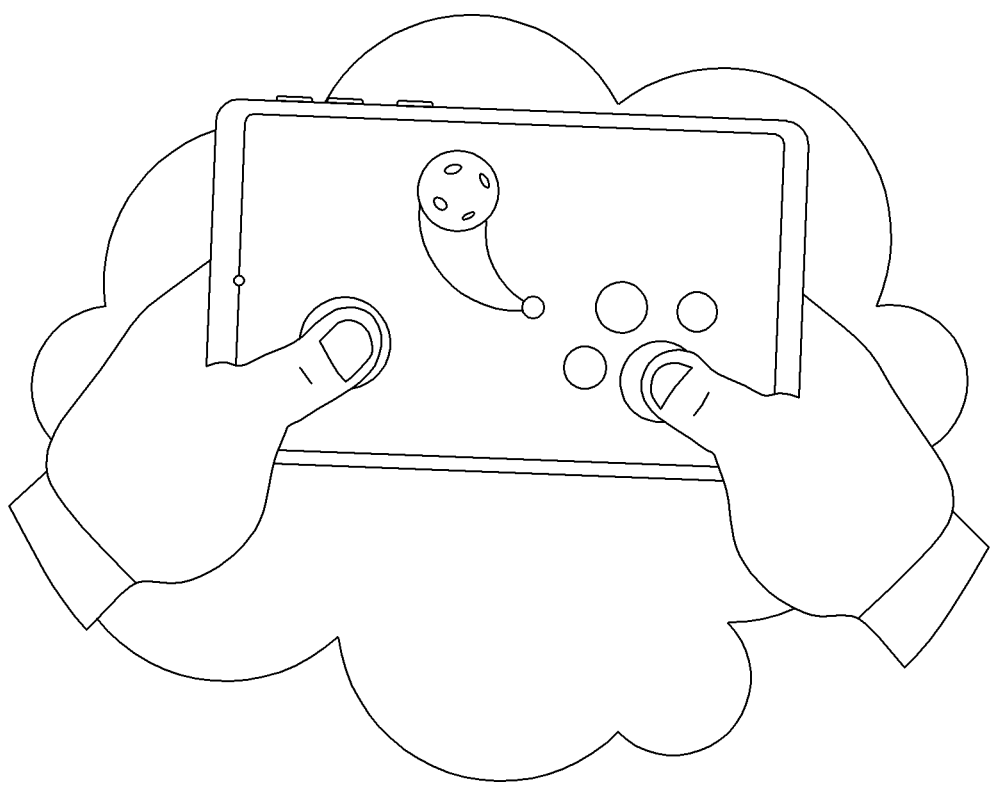
FIG. 11C illustrates different use cases for detecting frame drops in several scenarios and preventing them, according to an embodiment of the disclosure.

FIGS. 11A, 11B, and 11C illustrates different use cases for detecting frame drops in several scenarios and preventing them according to various embodiments of the disclosure.

FIG. 11A illustrates watching High-Definition (HD) videos/social media according to an embodiment of the disclosure. FIG. 11B illustrates an aggressive browser content scroll according to an embodiment of the disclosure. FIG. 11C illustrates consistent frame rate while gaming according to an embodiment of the disclosure.

Figure 12:
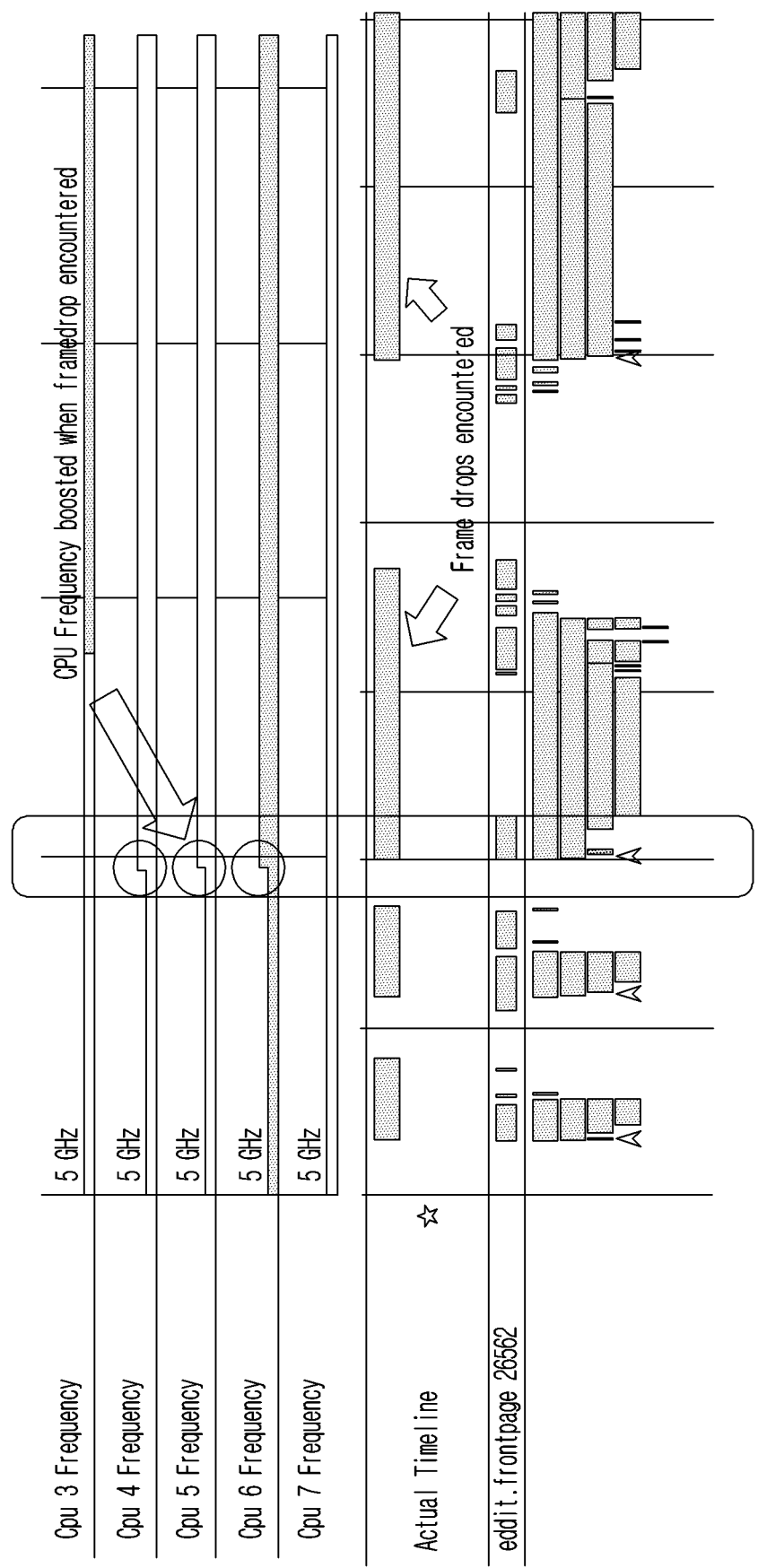
FIG. 12 illustrates an example implementation of the proposed method for managing frame drops, according to an embodiment of the disclosure.

FIG. 12 illustrates an example implementation of the proposed method (600, 700, 800) for managing frame drops according to an embodiment of the disclosure.

First, a system trace and a map application timeline with CPU data are collected on a device. The frame drop case is highlighted in trace and CPU frequencies are checked at the point. A spike can be observed in CPU frequencies, when a frame drop is predicted and a preventive measure is applied.

For example, when a user begins scrolling an application, the user may notice stuttering frames due to frame drops. The proposed methods (600, 700, 800) can predict the future janky frames and apply policies to avoid frame drops thereby achieving smooth and fluid UI experience for end user Therefore, the proposed device and methods (600, 700, 800) determine next frame drop or consecutive frame drops to implement proactive decisions such as boosting/scheduling in order to reduce frame drops. The electronic device 200 can be, but not limited to phone, Television (TV), camera, washing machine, refrigerator, smartwatch, and so on. Thus, the rendering performance can be improved and frame drops can be reduced during critical user journeys such as scrolling, application launching, gaming, browsing, and several other use cases, overall improving user experience on the electronic device 200.

The embodiments disclosed herein can be implemented through at least one software program running on at least one hardware device. The modules shown in FIG. 2 include blocks which can be at least one of a hardware device, or a combination of hardware device and software module.

The embodiment disclosed herein describes an electronic device (200) and methods (600, 700, 800) for predicting and preventing one or more frame drops to enhance User Interface (UI) experience on an electronic device 200. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an application-specific integrated circuit (ASIC), or a combination of hardware and software means, e.g. an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, e.g. using a plurality of CPUs.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing frame drops in an electronic device, the method comprising:
   determining, by the electronic device, one or more display frame parameters for displaying each frame;
   determining, by the electronic device, one or more device operating parameters indicative of a system state of one or more resources in the electronic device;
   estimating, by the electronic device, a preparation time for rendering each frame on the electronic device using the one or more display frame parameters and the one or more device operating parameters; and
   adjusting, by the electronic device, the one or more resources in the electronic device to reduce the preparation time, in response to the estimated preparation time indicating occurrence of a frame drop.

2. The method as claimed in claim 1, wherein the method comprising:
   detecting, by the electronic device, a scenario of having a possibility of the frame drop based on one or more parameters from at least one touch input received from a user; and
   managing, by the electronic device, the frame drops based on the detected scenario.

3. The method as claimed in claim 2, wherein the detected scenario comprises at least one of aggressive scrolling, gaming, or playing high resolution content.

4. The method as claimed in claim 2, wherein the one or more parameters from the at least one touch input comprises at least one of frequency, velocity, input pressure level, or at least one multi-hand gesture.

5. The method as claimed in claim 1, wherein the one or more display frame parameters comprises at least one of input handling duration, animation duration, or draw duration.

6. The method as claimed in claim 1, wherein the one or more device operating parameters comprises at least one of load of a Central Processing Unit (CPU), state of a Graphics Processing Unit (GPU), available memory, number of running threads on the CPU, or temperature.

7. The method as claimed in claim 1,
   wherein the preparation time for rendering each frame is estimated using a frame duration prediction (FDP) method,
   wherein the FDP method is a Machine Learning (ML) method, and
   wherein the FDP method is trained to learn a correlation between the one or more display frame parameters, the one or more device operating parameters and the preparation time for rendering each frame.

8. The method as claimed in claim 7, wherein the trained FDP method is configured to:
   predict a consecutive frame duration based on a current frame duration; and
   determine the frame drop, in response to the predicted consecutive frame duration exceeding a predetermined threshold.

9. The method as claimed in claim 1,
   wherein the one or more resources comprises at least one of CPU, schedule, or governor, and
   wherein the method of adjusting the one or more resources comprises at least one of CPU boosting, and scheduling and governing tasks.

10. The method as claimed in claim 1,
wherein the one or more resources are adjusted using a policy decision module for a pre-determined duration, and
wherein the one or more resources are adjusted by determining a window duration based on a frame count.

11. An electronic device, comprising:
memory storing one or more computer programs; and
one or more processors communicatively coupled to the memory,
wherein the one or more computer programs include computer-executable instructions that, when executed by the one or more processors individually or collectively, cause the electronic device to manage frame drops,
wherein the computer-executable instructions further cause the electronic device to:
determine one or more display frame parameters for displaying each frame,
determine one or more device operating parameters indicative of a system state of one or more resources in the electronic device,
estimate a preparation time for rendering each frame on the electronic device using the one or more display frame parameters and the one or more device operating parameters, and
adjust the one or more resources in the electronic device to reduce the preparation time, in response to the estimated preparation time indicating occurrence of a frame drop.

12. The electronic device as claimed in claim 11, wherein the one or more computer programs further include computer executable instructions that, when executed by the one or more processors individually or collectively, cause the electronic device to:
detect a scenario of having a possibility of the frame drop based on one or more parameters from at least one touch input received from a user; and
manage the frame drops based on the detected scenario.

13. The electronic device as claimed in claim 12, wherein the detected scenario comprises at least one of aggressive scrolling, gaming, or playing high resolution content.

14. The electronic device as claimed in claim 12, wherein the one or more parameters from the at least one touch input comprises at least one of frequency, velocity, input pressure level, or at least one multi-hand gesture.

15. The electronic device as claimed in claim 11, wherein the one or more display frame parameters comprises at least one of input handling duration, animation duration, or draw duration.

16. The electronic device as claimed in claim 11, wherein the one or more device operating parameters comprises at least one of load of a Central Processing Unit (CPU), state of a Graphics Processing Unit (GPU), available memory, number of running threads on the CPU, or temperature.

17. The electronic device as claimed in claim 11,
wherein the preparation time for rendering each frame is estimated using a frame duration prediction (FDP) method,
wherein the FDP method is a Machine Learning (ML) method, and
wherein the FDP method is trained to learn a correlation between the one or more display frame parameters, the one or more device operating parameters and the preparation time for rendering each frame.

18. The electronic device as claimed in claim 17, wherein the trained FDP method is configured to:
predict a consecutive frame duration based on a current frame duration; and
determine the frame drop, in response to the predicted consecutive frame duration exceeding a predetermined threshold.

19. The electronic device as claimed in claim 18, wherein the predetermined threshold is based on a Vsync interval of a display of the electronic device.

20. The electronic device as claimed in claim 18, wherein the one or more display frame parameters and the one or more device operating parameters are compiled into a preprocessed data format for recording into a database and the FDP method is trained with data recorded in the database.

* * * * *